Patented Feb. 16, 1937

2,071,312

UNITED STATES PATENT OFFICE 2,071,312

PROCESS FOR PREPARING A SYNTHETIC RESIN COMPOSITION

Sydney Leonard Morgan Saunders, London, England

No Drawing. Application March 2, 1935, Serial No. 9,103. In Great Britain December 21, 1933

3 Claims. (Cl. 260—8)

This invention relates to alkyd resins and to varnishes comprising these resins and a vegetable oil and/or other resins.

The object of the invention is to provide a modified process for the manufacture of synthetic resin compositions containing semi-drying, or drying oils, with or without naturally occurring resins.

It has been proposed hithereto to condense a substituted polyhydric alcohol and a polybasic organic anhydride in the presence or absence of an organic solvent or diluent, the condensation taking place in the presence of glycerol esters of fatty acids (for example, drying oils), the substituted polyhydric alcohols being inter alia those with one (or two) hydroxyl groups esterified by a monobasic organic acid such as benzoic or acetic acid.

The products obtained from these methods are soluble in vegetable oils only to a limited extent, according to the proportion of fatty oil constituent present. They are, however, insoluble in heat treated drying, or semi-drying oils, except where the proportion of fatty oil constituent is so large as to detract from their usefulness.

According to the present invention a process for preparing a synthetic resin composition comprises the condensation of a polybasic organic acid or anhydride with a polyhydric alcohol which is partially esterified with the fatty acid of a vegetable oil.

The best results are obtained when the partial ester contains approximately two free hydroxyl groups and greater solubility in vegetable oils is obtained if the condensation reaction is carried out in the presence of a drying or non-drying oil, which is preferably heat-treated prior to its employment in the condensation reaction.

It is an advantage also to prepare the partial ester from heat-treated vegetable oil or, alternatively, the partial ester itself should be heat-treated prior to the condensation reaction. The partial ester may also be one with a resin acid instead of a vegetable oil acid.

Dyes or pigments may be incorporated at any stage in the manufacture.

The following examples illustrate the nature of this invention, but the invention is not restricted to these examples: The parts are by weight.

Example 1

35 parts of the monoglyceride of linoleic acid are heated with 35 parts of heat-treated wood oil and 15 parts of phthalic anhydride to 190–200° C. for 1 hour in the presence of an inert gas, such as carbon dioxide. The temperature is then raised to 260° C. for 15 minutes after which it is cooled and thinned with hydrocarbon (aliphatic or aromatic), to varnish consistency and the necessary driers added.

Example 2

30 parts eleostearic monoglyceride are heated with 30 parts heat bodied linseed oil together with 10 parts of phthalic anhydride to 190–200° C. in the presence of an inert gas such as carbon dioxide. The temperature is then raised to 250–260° C. for 1 hour. The product may be thinned with white spirit and the necessary driers added to produce a varnish which dries to a hard film in 6 hours.

I claim:—

1. A process for preparing a synthetic resin composition soluble in vegetable oils which consists in mixing together:—

(a) A drying oil which has been previously heat-treated,
    (b) A monoglyceride of a drying oil acid, and
    (c) Phthalic anhydride, and heating the mixture.

2. A process for preparing a synthetic resin composition soluble in vegetable oils which consists in mixing together heat-treated linseed oil, a monoglyceride of eleostearic acid, and phthalic anhydride and heating the mixture to 250° C. to 260° C.

3. A process for preparing a synthetic resin composition soluble in vegetable oils which consists in mixing together a heat-treated wood oil, a monoglyceride of linoleic acid, and phthalic anhydride and heating the mixture to 260° C.

SYDNEY LEONARD MORGAN SAUNDERS.